United States Patent
Heddes et al.

(10) Patent No.: US 7,143,414 B2
(45) Date of Patent: Nov. 28, 2006

(54) METHOD AND APPARATUS FOR LOCKING MULTIPLE SEMAPHORES

(75) Inventors: Marco Heddes, Lawrence, MA (US); Steven Kenneth Jenkins, Raleigh, NC (US); Ross Boyd Leavens, Cary, NC (US); Robert Brian Likovich, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 10/247,673

(22) Filed: Sep. 19, 2002

(65) Prior Publication Data
US 2003/0061259 A1 Mar. 27, 2003

Related U.S. Application Data

(60) Provisional application No. 60/325,076, filed on Sep. 26, 2001.

(51) Int. Cl.
G06F 9/46 (2006.01)
G06F 12/00 (2006.01)

(52) U.S. Cl. .................... 718/104; 718/100; 718/102; 710/200

(58) Field of Classification Search ........ 718/100–108; 710/200–244
See application file for complete search history.

(56) References Cited

U.S. PATENT DOCUMENTS

| | | | |
|---|---|---|---|
| 4,805,106 A | 2/1989 | Pfeifer | 364/200 |
| 4,907,228 A | 3/1990 | Bruckert et al. | 371/68.3 |
| 5,142,632 A | 8/1992 | Tychon et al. | 395/375 |
| 5,159,686 A | 10/1992 | Chastain et al. | 395/650 |
| 5,233,701 A | 8/1993 | Nakata | 395/425 |
| 5,261,106 A | 11/1993 | Lentz et al. | 395/725 |
| 5,276,886 A | 1/1994 | Dror | 395/725 |
| 5,339,443 A | 8/1994 | Lockwood | 395/725 |
| 5,485,593 A | 1/1996 | Baker | 395/200.08 |
| 5,548,780 A | 8/1996 | Krein | 395/825 |
| 5,613,139 A | 3/1997 | Brady | 395/800 |
| 5,664,092 A | 9/1997 | Waites | 395/183.01 |
| 5,675,829 A | 10/1997 | Oskouy et al. | 395/826 |
| 5,696,939 A | 12/1997 | Iacobovici et al. | 395/477 |
| 5,734,909 A | 3/1998 | Bennett | 395/726 |
| 5,842,018 A | 11/1998 | Atkinson et al. | 395/700 |
| 5,852,731 A | 12/1998 | Wang et al. | 395/670 |
| 5,862,180 A | 1/1999 | Heinz | 375/244 |

(Continued)

FOREIGN PATENT DOCUMENTS

EP 0953903 A2 11/1999

(Continued)

OTHER PUBLICATIONS

Focazio et al., "Microkernel Synchronization Primitives", IBM Technical Disclosure Bulletin, 1995, pp. 283-289.*

(Continued)

Primary Examiner—Meng-Al T. An
Assistant Examiner—Jennifer N. To
(74) Attorney, Agent, or Firm—Josh G. Cockburn; Dillon & Yudell LLP

(57) ABSTRACT

Processor threads in a multi-processor system can concurrently lock multiple semaphores by providing a lock command which includes the semaphore value and a semaphore number. Each processor is allocated two or more addressable semaphore stores, each of which include a multi-bit field identifying the requested semaphore and a one bit field identifying the locked status of the requested semaphore. The semaphore number determines which of the allocated semaphore stores are to be used for processing the lock command.

10 Claims, 4 Drawing Sheets

U.S. PATENT DOCUMENTS

| | | | | |
|---|---|---|---|---|
| 5,864,653 | A | 1/1999 | Tavallaei et al. | 315/181 |
| 5,893,157 | A | 4/1999 | Greenspan et al. | 711/150 |
| 5,901,308 | A | 5/1999 | Cohn et al. | 395/591 |
| 5,931,923 | A * | 8/1999 | Roberts | 710/36 |
| 6,018,785 | A * | 1/2000 | Wenniger | 710/200 |
| 6,026,427 | A | 2/2000 | Nishihara et al. | 709/106 |
| 6,029,190 | A | 2/2000 | Oliver | 709/107 |
| 6,070,254 | A | 5/2000 | Pratt et al. | 714/43 |
| 6,079,013 | A | 6/2000 | Webb et al. | 712/227 |
| 6,105,085 | A | 8/2000 | Farley | 710/41 |
| 6,119,246 | A | 9/2000 | McLaughlin et al. | 714/27 |
| 6,122,713 | A | 9/2000 | Huang et al. | 711/147 |
| 6,125,401 | A | 9/2000 | Huras et al. | 709/300 |
| 6,128,706 | A | 10/2000 | Bryg et al. | 711/141 |
| 6,131,094 | A | 10/2000 | Gord | 707/8 |
| 6,134,579 | A | 10/2000 | Tavallaei et al. | 709/100 |
| 6,134,619 | A | 10/2000 | Futral et al. | 710/112 |
| 6,154,847 | A | 11/2000 | Schofield et al. | 714/4 |
| 6,161,169 | A | 12/2000 | Cheng | 711/150 |
| 6,173,313 | B1 | 1/2001 | Klots et al. | 709/203 |
| 6,182,108 | B1 | 1/2001 | Williams et al. | 709/102 |
| 6,199,094 | B1 | 3/2001 | Presler-Marshall | 709/104 |
| 6,725,457 | B1 * | 4/2004 | Priem et al. | 718/104 |
| 6,748,470 | B1 * | 6/2004 | Goldick | 710/200 |
| 7,036,125 | B1 * | 4/2006 | Basso et al. | 718/104 |
| 7,062,583 | B1 * | 6/2006 | Kolinummi et al. | 710/200 |
| 7,089,555 | B1 * | 8/2006 | Calvignac et al. | 718/100 |
| 7,100,161 | B1 * | 8/2006 | Latour | 718/102 |
| 2002/0138544 | A1 * | 9/2002 | Long | 709/107 |
| 2003/0002440 | A1 * | 1/2003 | Calvignac et al. | 370/229 |
| 2003/0005195 | A1 * | 1/2003 | Davis et al. | 710/200 |
| 2003/0060898 | A1 * | 3/2003 | Jenkins et al. | 700/2 |
| 2003/0115476 | A1 * | 6/2003 | McKee | 713/193 |
| 2003/0145035 | A1 * | 7/2003 | de Bonet | 709/102 |

FOREIGN PATENT DOCUMENTS

| | | |
|---|---|---|
| EP | 1033654 A1 | 9/2000 |
| JP | 4361340 | 12/1992 |
| JP | 8329019 | 12/1996 |
| JP | 9044376 | 2/1997 |
| JP | 1 1039176 | 2/1999 |
| JP | 9231123 | 2/1999 |
| JP | 11272480 | 10/1999 |
| JP | 2001005694 | 1/2001 |
| JP | 2001022720 | 1/2001 |
| WO | WO9603697 | 2/1996 |

OTHER PUBLICATIONS

Focazio et al., "Microkernel Semaphores", IBM Technical Disclosure Bulletin, 1995, pp. 111-117.*

IBM Technical Disclosure Bulletin vol. 30, No. 3, Aug. 1987, p. 1203, "Non-Atomic (Ordered) Semaphore Operations".

Research Disclosure, Aug. 2000, p. 1442, article 436131, "User lever writing to a pinned kernel buffer in an SMP system".

IBM Technical Disclosure Bulletin vol. 37, No. 12, Dec. 1994, "Error Handler Installation Procedure", pp. 239-240.

IBM Technical Disclosure Bulletin vol. 37, No. 06A, Jun. 1994, "Shared Memory Cluster—A Scalable Multiprocessor Design", pp. 503-507.

IBM Technical Disclosure Bulletin vol. 30, No. 5, Oct. 1987, "Fast Method for Simultaneous Exclusive Table Modifications", pp. 348-350.

IBM Technical Disclosure Bulletin vol. 38 No. 4, Apr. 1995, "Hardware Contention Serialization Algorithm", pp. 73-77.

IBM Technical Disclosure Bulletin vol. 33, No. 4, Sep. 1990, "Store Purge Pipeline for Mid-Range Processor", pp. 299-301.

IBM Technical Disclosure Bulletin vol. 36, No. 6A, Jun. 1993, "Emulator DosExit Processing for Reporting Errors", pp. 255-256.

Research Disclosure No. 317, Sep. 1990, "Improved Error Detection Using MP Fields".

IBM Technical Disclosure Bulletin No. 9. Feb. 1991, "System Support for Multiprocessing Without an Atomic Storage", pp. 18-23.

E. Chang, "N-Philosophers: an Exercise in Distributed Control", Computer Networks vol. 4, No. 2,, Apr. 1980, pp. 71-76.

P. Bohannon et al., "Recoverable User-Level Mutual Exclusion", Proceedings, 7th IEEE Symposium on Parallel and Distributed Processing (Cat. No. 95TB8131), 1995, pp. 293-301.

J. Thornley et al., "Monotonic counters: a New Mechanism for Thread Synchronization", Proceedings 14th International Parallel and Distributed Processing Symposium, IPDPS 2000, pp. 573-582.

K. C. Tai et al., "VP: A New Operation for Semaphores", Operating Systems Review, vol. 30, No. 3, Jul. 1996, pp. 5-11.

Mei Chen Chia et al., "A Resource Synchronization Protocol for Multiprocessor Real-Time Systems", Proceedings of the 1994 International Conference on Parallel Processing, Pt. vol. 3, 1994, pp. 159-162.

Heng Liao et al., "Hardware Support for Process Synchronization Algorithms", Mini-Micro Systems, vol. 16, No. 9, Sep. 1995, pp. 7-13.

Chung Wu Chaio et al., "The Design and Implementation of a Distributed Semaphore Facility: DISEM", Proceedings of the National Science Council, Republic of China, Part A, vol. 19, No. 4, Jul. 1995, pp. 319-320.

D. Scholefield, "Proving Properties of Real-Time Semaphores", Science of Computer Programming, vol. 24, No. 2, Apr. 1995, pp. 159-181.

D. Weiss, "Shared Bus Semaphore Detector Proposal", Motorola Technical Developments, vol. 3, Mar. 1983, pp. 74-78.

J. Milde et al., "Realization of Synchronization Tools and their Efficiency in the Multiprocessor System M5PS", 10th IMACS World Congress on System Simulation and Scientific Computation, vol. 1, 1982, pp. 333-335.

N. Wait, "VME- a Microcomputer Bus on Europe", New Electronics vol. 15, No. 16,Aug. 17, 1992, pp. 57-58.

N. Marovac, "Interprocess Syncrhonization and Communication in Distributed Architectures", 3rd InternaTional Conf. On Computer Science) Chile, 1983 pp. 1-16.

N. Marovac, "On Interprocess Interaction in Distributed Architectures", Computer Architecture News vol. 11, No. 4, Sep. 1983, pp. 17-22.

T. Balph, "Interprocessor Communication in a Tightly coupled Multiple Processor Architecture", Second Annual Phoenix Conference on Computers and Communications, 1983 Conf. Proceedings pp. 21-25.

* cited by examiner

METHOD AND APPARATUS FOR LOCKING MULTIPLE SEMAPHORES

This application claims the benefit of the filing date of provisional application Ser. No. 60/325,076, filed Sep. 26, 2001 for METHOD FOR LOCKING MULTIPLE SEMAPHORES IN HARDWARE.

FIELD OF THE INVENTION

The invention relates to semaphore management subsystems and more particularly to generic semaphore management subsystems and method for locking multiple semaphores.

BACKGROUND

Within a network processor several data frames are processed at the same time. Each data frame is processed by one processor/thread. Each processor/thread operates independently from all the other processors/threads. Thus, as the software (picocode) processes a data frame, the software has no knowledge of other frames which have been, are being, or will be processed. As data frames are processed, a thread may need access to a shared resource. This shared resource is shared among all threads. To allow a thread access to the resource without interference from other threads, semaphores are used.

A semaphore is a mechanism which allows a processor/thread to use a resource without interference from another processor/thread. A semaphore is used to ensure one and only one processor/thread has "ownership" of a given resource at any given time.

A network processor is a multi-processor environment with resources which can be accessed by all processors/threads. Thus, semaphores are an intricate part of network processors. As discussed above, network processors process data frames which belong to one or more data flows. To increase performance and eliminate the need to use general system resources, semaphore management in hardware is implemented.

When writing software, it is often desirable to access more than one resource within the scope of a software function. If updates to these resources are necessary, it is desirable to lock these resources. As software functions get more complex, it becomes necessary to lock multiple resources. As a specific example, consider tree management on a Network Processor. In this algorithm, picocode may need to lock the root of the tree chain that it is working on. In addition, picocode may also need to lock the leaf address which may be updated from multiple places. Implementing this algorithm requires the locking of two semaphores simultaneously.

Another example is when common software functions are used. Common software routines are software routines that can be accessed from any thread. Some common routines cannot be run on multiple threads at the same time, for example, common software routines used in queue management. Picocode may need to access the Free Queue, and also a general purpose queue at the same time and this would be done with two separate routines protected by two different semaphores to prevent the routines from running on multiple threads. One can see that the ability to lock multiple semaphores at once can provide a significant performance increase. Some common code routines require multiple semaphores to be locked at the same time in order to maximize execution performance. Having multiple semaphores per thread allows all the threads to execute these common code routines. If only one semaphore is available, one thread would have to be dedicated to running the common code routines that require multiple semaphores. Multiple semaphores provide finer granularity in locking resources and provide the ability for different combinations of locked down resources. With a single semaphore, groups of resources would have to be pre-defined for locking down together. With multiple semaphores, the software has more freedom in the ability to pick and choose the combinations of resources to be locked down, providing a very flexible and powerful solution.

SUMMARY OF THE INVENTION

Described is a semaphore system that enables one entity to lock multiple semaphores simultaneously. The semaphore system includes a storage structure in which N (N can be any value greater than 0) storage locations are assigned to each thread of a multiprocessing complex. A one-bit indicator is provided for each storage location. The setting of the indicator indicates the state of the semaphore associated with the location. For example, if the bit is set to a logical "1", the semaphore is locked and unlocked if the bit is set to logical "0". The address (i.e. the semaphore value) of the semaphore can be recorded in each location.

A software lock command is generated to lock one of N semaphores assigned to each thread of a multiprocessing unit. For example, assume N=2. To lock both semaphores, one lock command is issued with sem_num=0 and a second lock command is issued with sem_num=1. Of course a single command with appropriate parameters (two semaphore values) could be issued to lock both semaphores. A software unlock (Semaphore_Unlock) command is structured such that it can unlock anywhere from one locked semaphore to N locked semaphores.

DETAILED DESCRIPTION OF THE INVENTION

Figure 1:
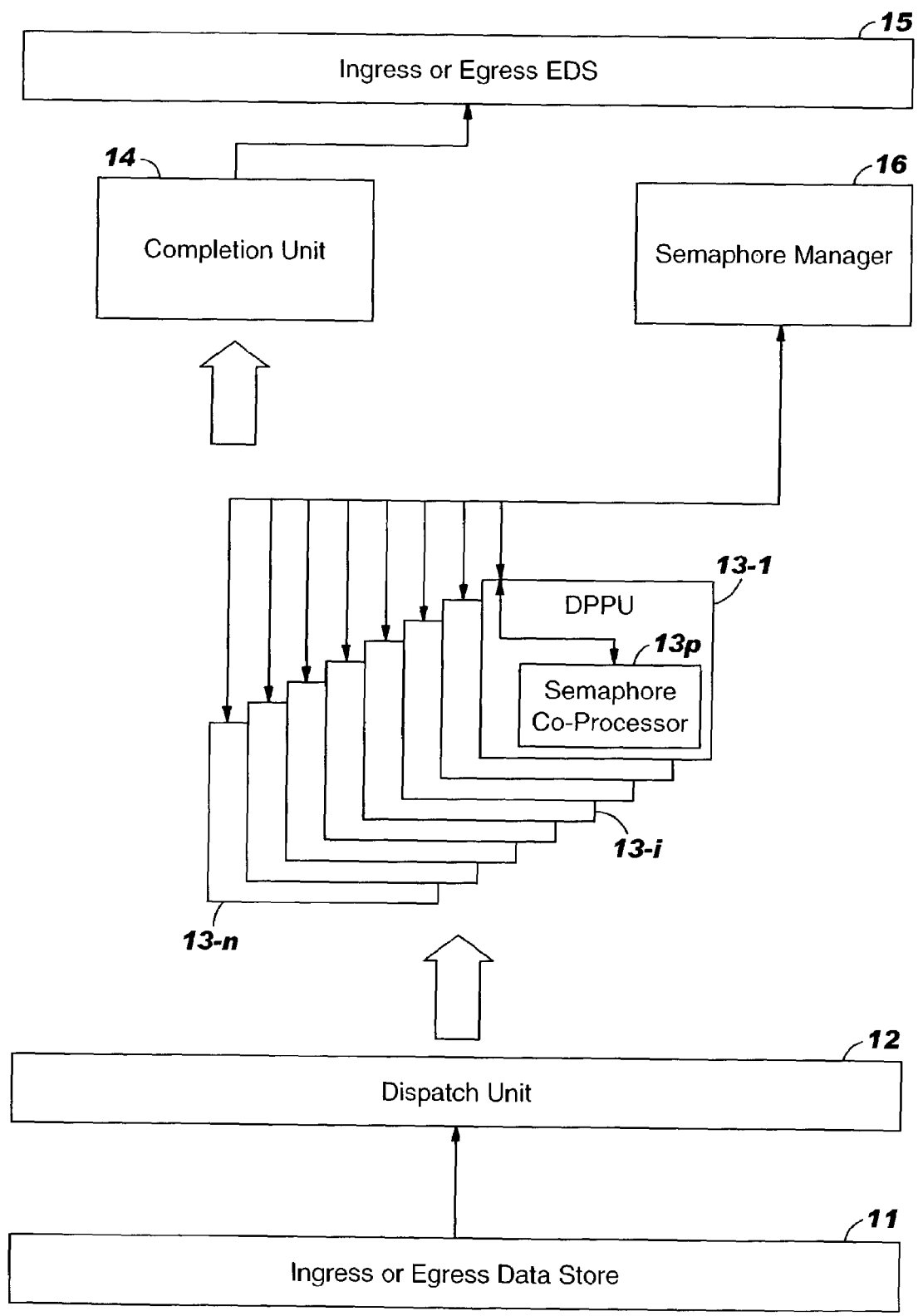
FIG. 1 is a block diagram of an application system which incorporates a semaphore manager subsystem according to the invention.

This invention is described in conjunction with the Semaphore Management System For Use With Multi-Thread Processor Systems (hereinafter the SMS system) described in USPTO published application 2003/0005195 A1, published Jan. 2, 2003 and incorporated herein by reference. To the extent possible similar components will use the same reference numerals used therein. While the invention is described in conjunction with the SUS system, it will be apparent to those skilled in the art that it is adaptable for use with a variety of semaphore management systems such as the Ordered Semaphore Management Subsystem described in USPTO published application 2003/0002440 A1, published Jan. 2, 2003 and USPTO application for Flow Look Ahead in an Ordered Semaphore Management System filed herewith.

In FIG. 1 a network processor such as the IBM processor identified in the above incorporated application includes an input/output data storage unit 11 which stores a plurality or stream of data frames which require processing. A dispatching unit 12 transfers individual data frames to a plurality of processors 13-1-13-n which process the individual frames received from the dispatching unit 12. The processors 13-1-13-n pass the processed data frames on to a completion unit 14 which reassembles the data frames before passing the reassembled stream of data frames on to a second input/output unit 15.

Each of the processors 13-1-13-n include a semaphore coprocessor 13p which interfaces a hardware semaphore manager subsystem 16 constructed according to the invention. The semaphore subsystem 16 is implemented in hardware and interfaces with, for example, the Dyatic Protocol Processor Unit (DPPU) of the using processing system. Each DPPU contains four threads which can each process one data frame. Each DPPU has one Semaphore Co-Processor associated with it. The threads in a given DPPU interface to the one Semaphore Co-Processor within the DPPU. The multiple Semaphore Co-Processors all communicate with the central Semaphore Manager subsystem. The Semaphore Manager subsystem 16 contains all of the tables and control logic to lock, unlock, and arbitrate for semaphores.

Figure 2:
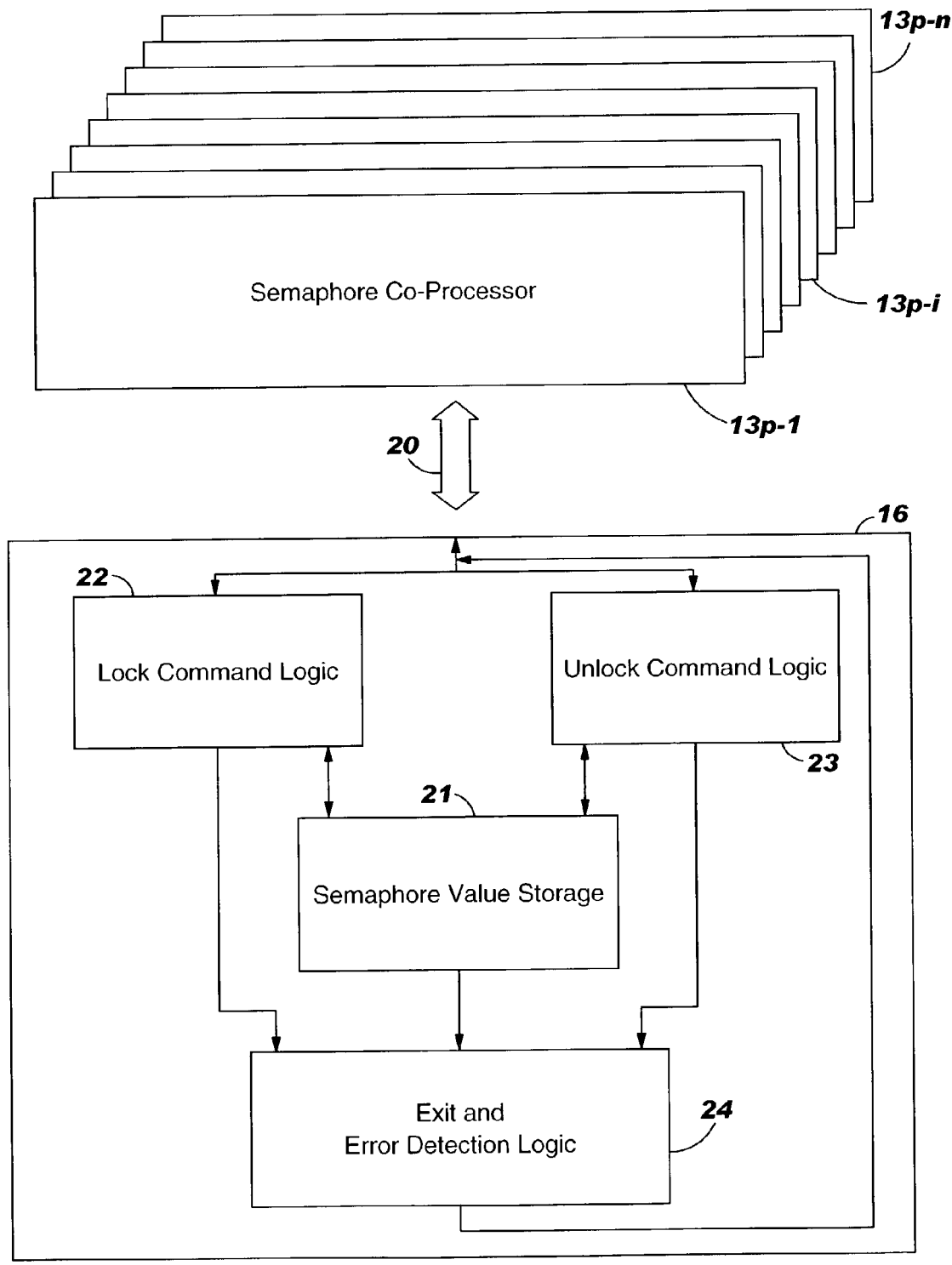
FIG. 2 is a block diagram of a semaphore manager subsystem according to the invention.

In FIG. 2 the semaphore coprocessors 13p-1-13p-n communicate with the Semaphore Manager subsystem 16 via a bus 20. The subsystem 16 includes a semaphore value storage 21, a semaphore lock command logic 22, semaphore unlock command logic 23 and semaphore exit and error detection logic 24. Except for the semaphore value storage 21 and the lock command logic 22, the remaining components of FIG. 2 operate as described in the incorporated SMS system application.

Figure 3:
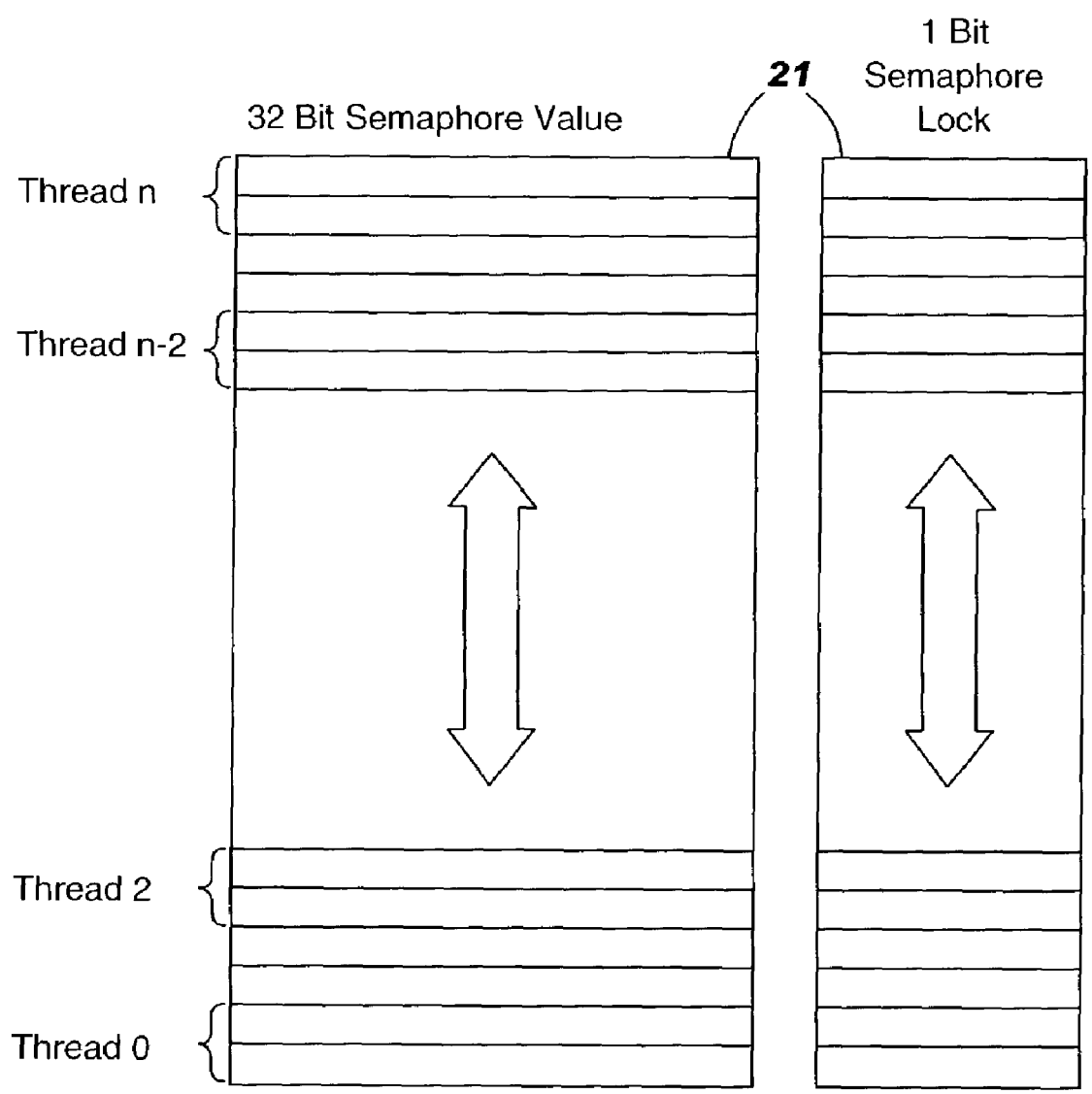
FIG. 3 is a diagram of the semaphore value storage 21 of FIG. 2.

FIG. 3 is a block diagram of the semaphore value storage 21. The storage can be based upon a RAM, CAM, or discrete latches. Each thread is assigned two or more addresses in the storage 21. Each storage location has two registers. The first register (Semaphore_Value) is a 32 bit register which holds the 32 bit Semaphore Value (Sem_Val) that can be locked by the associated thread. The second register (Semaphore_Lock) is a 1 bit register which indicates if the Sem_Val stored in the associated Semaphore_Value register is locked or unlocked. When the Semaphore_Lock register is set to 1'b, the Sem_Val in the Semaphore_Value register is locked. When the Semaphore_Lock register is reset to '0'b, no Sem_Val is locked by the associated software thread. An alternate implementation would be to have a single register for each storage location with two fields, one for the Semaphore Value, and one for indicating the lock/unlock status of the Semaphore Value.

A semaphore can be locked when a software thread issues a single command "Semaphore Lock" (Sem_Lock) with three parameters. The first parameter is the "Semaphore Value" (Sem_Val). This is, for example, a 32 bit value which the thread wishes to lock. The second parameter is the "Timeout Enable" (Timeout_Enable) bit. When the Timeout Enable bit is set and the requested semaphore is already locked by a different thread, the Semaphore Lock command will terminate without locking the semaphore. The third parameter is the Semaphore Number (Sem_Num). This parameter indicates which of the two or more assigned addresses in storage 21 the requested semaphore value is to be stored at, or unlocked in the case of an unlock command. As pointed out above, two semaphores can be locked at the same time by issuing two semaphore lock commands. A single command with appropriate parameters (two or more Sem_Val's and associated Sem_Num's) could be implemented.

In the preferred embodiment, each thread has more than one assigned register in the semaphore value storage and is thus identified as the source of the semaphore value requested. Alternatively, a content addressable memory system could be used in which case the requested semaphore value can be placed in any available register along with the thread number/ID and the Sem_Num to distinguish between multiple semaphore requests from the same thread.

In the preferred embodiment each thread was allocated two storage locations and could concurrently lock two different semaphores. The relative addresses of the allocated storage locations are determined by multiplying the thread number or ID (0 thru n) by two and adding the Sem_Num value (0 or 1). If more than two Sem_Num's are used the relative addresses for each thread can be determined by multiplying the thread number (0 thru n) by the maximum number m of Sem_Num's and adding the specific Sem_Num (0 thru (m−1)) provided with the semaphore lock request.

Figure 4:
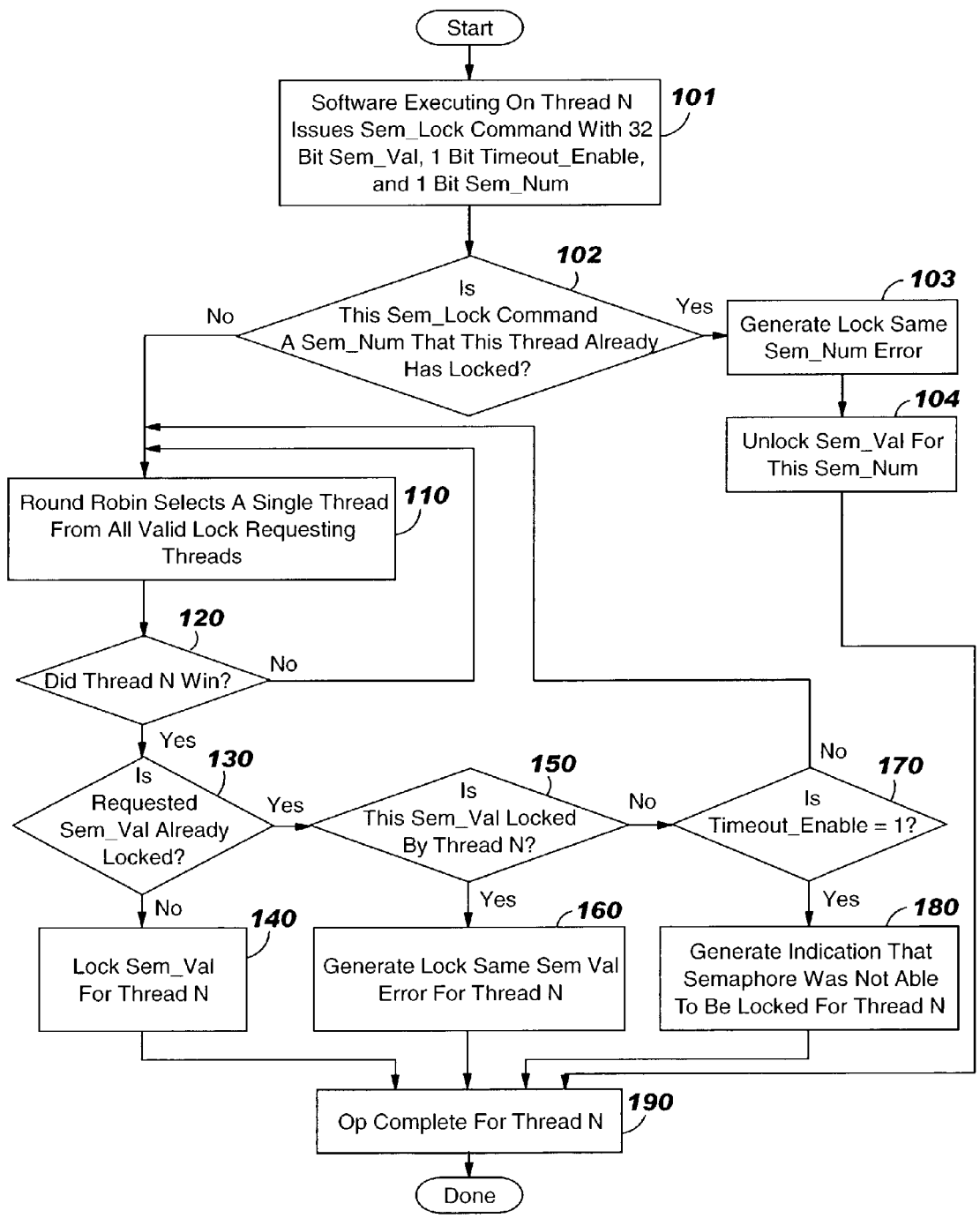
FIG. 4 is a flow diagram defining the lock command logic 22 of FIG. 2.

FIG. 4 illustrates the logic flow of the Semaphore Lock command. At block 101, the software executing on thread N issues a Semaphore Lock (Sem_Lock) command with three parameters, Semaphore Value (Sem_Val) field, a 32 bit value, a Semaphore Number (Sem_Num) field and a Timeout Enable (Timeout_Enable) field, a 1 bit value. In block 102 the contents of storage associated with thread N are examined to determine if thread N has already locked this same Sem_Num. If the same Sem_Num is already locked by thread N the semaphore manager generates a lock same Sem_Num error 103 and unlocks the Sem_Val associated with the Sem_Num 104. Processing for this request competes at 190.

If block 102 is negative the process proceeds to block 110, a fair round-robin function which selects one Semaphore Lock Command to service. This function selects one thread of all threads which could all issue a Semaphore Lock command at the same time. Block 120 is a test to see if a Semaphore Lock command from a given thread won the round-robin selection. If the Semaphore Lock command did not win the round-robin selection, it is returned to block 110 (the round-robin function) until it does win.

If the Semaphore Lock command does win the round-robin selection, the logic flow continues to block 130. At block 130, the Semaphore Value (Sem_Val) parameter received with the Semaphore lock command is checked to determine if this 32 bit value (Sem_Val) is already locked. This is accomplished by comparing the Sem_Val to the contents of the Semaphore_Value registers in FIG. 3 which have their associated Semaphore Lock register set to '1'b. If the Sem_Val is not already locked, then Sem_Val is locked for thread N at block 140, and signals the requesting thread that the Semaphore Lock command is complete (without any errors) at block 190. To lock Sem_Val, Sem_Val and Sem_Num are written into the Semaphore_Value register associated with thread N and Sem_Num. The Semaphore_Lock register associated with thread N is set to '1'b.

If the Sem_Val is locked, block 150 checks if the Sem_Val is already locked by thread N, the same thread which is requesting to lock it again. If thread N is attempting to lock the Sem_Val for which it has already locked, block 160 will generate an error signal to the software program on thread N at block 160 and signals the Semaphore Lock command is complete at block 190.

If the Sem_Val is locked (go to block 150) and it is not locked by thread N, the thread requesting the Sem_Val to be locked, control is passed to block 170. At block 170, the Timeout_Enable parameter is checked. If the Timeout_Enable parameter is not set (logic '0'b), this Sem_Lock command is returned to the round-robin selection algorithm, block 110. This allows the Sem_Val command to eventually lock the Sem_Val once it becomes unlocked. If the Timeout_Enable parameter is set (logic '1'b) at block 170, block 180 will signal the software program that the Sem_Val was not able to be locked for thread N. The Semaphore Lock command is complete at block 190.

The foregoing is illustrative of the present invention and is not to be construed as limiting the invention. While several embodiments of this invention have been described in detail, those skilled in this art will readily appreciate that many modifications are possible without materially departing from the novel teachings and advantages of this invention. Accordingly, all such modifications are intended to be included within the scope of this invention as defined by the claims. In the claims, means-plus-function clauses are intended to cover the structures described herein as performing the recited function and structural functional equivalents thereof. Therefore, it is to be understood that the foregoing is illustrative of the present invention and is not to be construed as limited to the specific embodiments disclosed, and that modifications to the disclosed embodiments, as well as other embodiments, are intended to be included within the scope of the claims appended hereto.

We claim:

1. In a multi-processor application system including one or more shared resources each controlled by a unique semaphore, a semaphore management subsystem comprising:
   a storage means having a plurality of registers each associated with a processor (thread) requesting a semaphore, said register including a first field for storing a unique Semaphore Value (Sem_Val) and a second field for indicating the locked status of the identified Sem_Val;
   a first logic circuit responsive to a semaphore lock request from a thread which includes at least one semaphore value (Sem_Val) and a corresponding semaphore number (Sem_Num) for examining the storage means associated with the thread to determine the status of the requested Sem_Num and providing a first output indicating a locked status or a second output indicating an unlocked status of the requested Sem_Num by the thread;
   a second logic circuit responsive to said first output from the first logic circuit for generating a Lock Same Sem_Num Error, and,
   a third logic circuit responsive to said second output from the first logic circuit for processing the requested Sem_Val.

2. In a multi-processor application system including, one or more shared resources each controlled by a unique semaphore, a semaphore management subsystem comprising:
   a storage means having a plurality of registers each associated with a processor (thread) requesting a semaphore, said register including a first field for storing a unique Semaphore Value (Sem_Val) and a second field for indicating the locked statue of the identified Sem_Val;
   a first logic circuit responsive to a semaphore lock request from a thread which includes at least one semaphore value (Sem_Val) and a corresponding semaphore number (Sem_Num) for examining the storage means associated with the thread to determine the status of the requested Sem_Num and providing a first output indicating a locked status or a second output indicating an unlocked status of the requested Sem_Num by the thread, wherein each thread in the application system is permanently assigned at least two registers in the storage means and the Sem_Num identifies one of the at least two registers permanently assigned to the thread;
   a second logic circuit responsive to said first output from the first logic circuit for generating a Lock Sem_Num Error; and
   a third logic circuit responsive to said second output from the first logic circuit for processing the requested Sem_Val.

3. The semaphore management subsystem set forth in claim 2 in which each thread in the application system is permanently assigned a number of registers equal to the maximum Sem_Num value.

4. In a multi-processor application system including, one or more shared resources each controlled by a unique semaphore, a semaphore management subsystem comprising:
   a storage means having a plurality of registers each associated with a processor (thread) requesting a semaphore, said register including a first field for storing a unique Semaphore Value (Sem_Val) and a second field for indicating the locked status of the identified Sem_Val, wherein the storage means include a plurality registers which are dynamically assigned to threads requesting a semaphore and each register also includes a thread ID field and a Sem_Num field for accessing a register associated with a thread;
   a first logic circuit responsive to a semaphore lock request form a thread which includes at least one semaphore value (Sem_Val) and a corresponding semaphore number (Sem_Num) for examining the storage means associated with the thread to determine the status of the requested Sem_Num and providing a first output indicating a locked status or a second output indicating an unlocked status of the requested Sem_Num by the thread;
   a second logic circuit responsive to said first output from the first logic circuit for generating a Lock Same Sem_Num Error; and
   a third logic circuit responsive to said second output form the first logic circuit for processing the requested Sem_Val.

5. The semaphore management subsystem set forth in claim 4 in which the maximum number of registers assignable at any given time to a thread is equal to the maximum Sem_Num value.

6. In a multi-processor application system including, one or more shared resources each controlled by a unique semaphore, a method for managing semaphores including the steps:
   Establishing a storage means having a plurality of registers each associated with a processor (thread) requesting a semaphore, said registers each including a first field for storing a unique Semaphore Value (Sem_Val) and a second field for indicating the locked status of the identified Sem_Val;
   In response to a semaphore lock request from a thread which includes at least one semaphore value (Sem_Val) and a corresponding a semaphore number (Sem_Num), examining the storage means associated with the thread to determine the status of the requested Sem_Num and providing a first output indicating a locked status of a second output indicating an unlocked status of the requested Sem_Num by the thread;

In response to a said first output generating a Lock Same Sem_Num Error; and,

In response to a said second output processing the requested Sem_Val.

7. In a multi-processor application system including, one or more shared resources each controlled by a unique semaphore, a method for managing semaphores comprising:

Establishing a storage means having a plurality of registers each associated with a processor (thread) requesting a semaphore, said registers each including a first field for storing a unique Semaphore Value (Sem_Val) and a second field for indicating the locked status of the identified Sem_Val;

In response to semaphore Lock request from a thread which includes at least one semaphore value (Sem_Val) and a corresponding semaphore number (Sem_Num), examining the storage means associated with the thread to determine the status of the requested Sem_Num and providing a first output indicating a locked status of a second output indicating an unlocked status of the requested Sem_Num by the thread, wherein each thread in the application system is permanently assigned at least two registers in the storage means and the Sem_Num identifies one of the at least two registers permanently assigned to the thread;

In response to a said first output, generating a Lock Same Sem_Num Error; and,

In response to a said second output, processing the requested Sem_Val.

8. The semaphore management subsystem set forth in claim 7 in which each thread in the application system is permanently assigned a number of registers equal to the maximum Sem_Num value.

9. In a multi-processor application system comprising one or more shared resources each controlled by a unique semaphore, a method for managing semaphores comprising:

Establishing a storage means having a plurality of registers each associated with a processor (thread) requesting a semaphore, said registers each including a first field for storing a unique Semaphore Value (Sem_Val) and a second field for indicating the locked status of the identified Sem_Val, wherein the storage means includes a plurality registers which are dynamically assigned to threads requesting a semaphore and each register also includes a thread ID field and a Sem_Num field for accessing a register associated with a thread;

In response to a semaphore lock request from a thread which includes at least one semaphore value (Sem_Val) and a corresponding semaphore number (Sem_Num), examining the storage means associated with the thread to determine the status of the requested Sem_Num and providing a first output indicating a locked status of a second output indicating an unlocked status of the requested Sem_Num by the thread;

In response to a said first output, generating a Lock Same Sem_Num Error; and

In response to a said second output, processing the requested Sem_Val.

10. The semaphore management subsystem set forth in claim 9 in which the maximum number of registers assignable at any given time to a thread is equal to the maximum Sem_Num value.

* * * * *